(12) United States Patent   (10) Patent No.: US 7,950,680 B2
Christensen                      (45) Date of Patent:  May 31, 2011

(54) WHEEL SUSPENSION FOR WHEELED VEHICLE

(75) Inventor: Assar Christensen, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 104 days.

(21) Appl. No.: 12/056,162

(22) Filed: Mar. 26, 2008

(65) Prior Publication Data

US 2008/0258418 A1    Oct. 23, 2008

(30) Foreign Application Priority Data

Apr. 2, 2007  (SE) ..................... 0700818

(51) Int. Cl.
    *B60G 3/26*    (2006.01)
(52) U.S. Cl. ................................. 280/124.135
(58) Field of Classification Search ........... 280/124.134, 280/124.135, 124.136, 124.138, 124.139, 280/124.141, 86.75, 124.103, 124.106, 124.15, 280/124.11, 124.145, 5.52, 5.521; *B60G 3/26*
    See application file for complete search history.

(56) References Cited

U.S. PATENT DOCUMENTS

| | | | | |
|---|---|---|---|---|
| 2,071,577 | A * | 2/1937 | Renwick et al. | ............... 267/230 |
| 3,137,513 | A | 6/1964 | Marot | |
| 3,497,233 | A | 2/1970 | Bolaski, Jr. | |
| 3,652,104 | A | 3/1972 | Chabek | |
| 5,451,073 | A | 9/1995 | Inoue | |
| 5,498,019 | A | 3/1996 | Adato | |
| 6,467,783 | B1 * | 10/2002 | Blondelet et al. | ...... 280/124.106 |
| 7,234,708 | B2 * | 6/2007 | Blondelet et al. | ........... 280/5.521 |
| 7,246,806 | B2 * | 7/2007 | Andre et al. | ........... 280/124.106 |
| 2003/0122336 | A1 | 7/2003 | Zadok | |

(Continued)

FOREIGN PATENT DOCUMENTS

EP    0506141 A1    9/1992

(Continued)

OTHER PUBLICATIONS

Australian Search Report mailed on Jun. 9, 2009, for Singapore patent Application No. SG 200802384-8 filed on Mar. 26, 2008, 4 pages.

(Continued)

*Primary Examiner* — Paul N Dickson
*Assistant Examiner* — Karen A Beck
(74) *Attorney, Agent, or Firm* — Morrison & Foerster LLP

(57) ABSTRACT

Wheel suspension (10) for a wheeled vehicle, comprising at least one lower, wheel-carrying radius arm (12) with an inner end, which is designed for fastening so that it can pivot about a substantially horizontal axis in a vehicle frame (14), and an outer end, which is pivotally fastened to a lower part of a wheel hub (24), and at least one upper support arm (28), one end of which is fastened to an upper part of the wheel hub (24), and the other end of which is pivotally connected to the vehicle frame (14). The inner end of the lower radius arm (12) is designed for pivotal connection to the vehicle frame (14) by way of a lower arm part (16) of a double rocker arm (18), swiveling about a substantially horizontal axis (20), whilst the upper support arm (28) is pivotally connected to an upper arm part (34) of the double rocker arm (18) via a connecting link (36), which is pivotally connected to the upper support arm (28) and to the upper arm part (34) of the double rocker arm (18).

12 Claims, 2 Drawing Sheets

U.S. PATENT DOCUMENTS

2004/0262985 A1* 12/2004 Nicolas ...................... 301/124.1
2006/0273539 A1* 12/2006 Barth et al. ............ 280/124.107

FOREIGN PATENT DOCUMENTS

| | | |
|---|---|---|
| JP | 64-056216 A | 3/1989 |
| JP | 03-279010 A | 12/1991 |
| SU | 1592171 A1 | 9/1990 |
| WO | WO-94/12359 A1 | 6/1994 |
| WO | WO-2007/087797 A | 8/2007 |
| WO | WO-2007/090372 A | 8/2007 |

OTHER PUBLICATIONS

Australian Written Opinion mailed on Jun. 9, 2009, for Singapore patent Application No. SG 200802384-8 filed on Mar. 26, 2008, 5 pages.

European Search Report and European Search Opinion mailed on Oct. 29, 2007 for EP 08446505.3, 9 pages.

* cited by examiner

WHEEL SUSPENSION FOR WHEELED VEHICLE

CROSS-REFERENCE TO RELATED APPLICATIONS

This application claims priority to Swedish Application No. 0700818-8, filed Apr. 2, 2007, which is hereby incorporated by reference in its entirety.

BACKGROUND OF THE INVENTION

1. Field of the Invention

The present invention relates to a wheel suspension for a wheeled vehicle of the type comprising at least one lower, wheel-carrying radius arm with an inner end, which is designed for fastening so that it can pivot about a substantially horizontal axis to a vehicle frame, and an outer end, which is pivotally connected to a lower part of a wheel hub, and at least one upper support arm, one end of which is fastened to an upper part of the wheel hub, and the other end of which is pivotally connected to a part of the vehicle fixed to the frame. The invention relates in particular, but not exclusively, to such a wheel suspension for relatively large and heavy motor vehicles, in which high ground clearance is desirable. The wheel suspension according to the invention has applications on both steered and unsteered wheels and on driving and non-driving wheels.

2. Related Art

In known wheel suspensions of the aforementioned type, compression and rebound movements of the wheels are often a cause of unwanted changes in the track width and changes in the camber angles of the wheels, which has an adverse effect on the driving characteristics of the vehicle and can lead to unwanted tyre wear.

In order to compensate for such changes in the compression and rebound movements of vehicle wheels, U.S. Pat. No. 3,652,104, for example, proposes an independent wheel suspension, in which a track width reduction occurring in a compression movement is compensated for by increasing the negative camber, the upper fastening point of the wheel being drawn in, so that at the lower edge the wheel is forced outwards away from the centre of the vehicle. In a rebound movement, however, the change in the track width will be greater, since the compensating mechanism tends to increase the positive camber, which draws the wheel in at the bottom edge whilst the geometric path of the suspension arm also draws the wheel in. In the case of long suspension travels, however, large changes in track width occur, for which this increase in the camber cannot compensate.

WO 94/12359 describes a vehicle wheel suspension system, in which the change in track width in a compression movement is compensated for in that control arms, which are seated in rubber bushings, are forced outwards in order to force the wheel out from the centre of the vehicle, thereby compensating for the geometric path of the suspension arm, which draws the wheel in. In the case of a rebound movement, on the other hand, there is no compensation, the wheel conventionally following the geometric path of the suspension arm, that is to say drawing the wheel in towards the centre of the vehicle.

U.S. Pat. No. 5,498,019 further describes a wheel suspension system which compensates for the change in track width in a compression movement in that a link forces the suspension arms and thereby the wheel outwards away from the centre of the vehicle. In the case of a rebound movement, however, the change in track width is pronounced, since both the geometry of the suspension arms and a compensation mechanism draw the wheel in towards the centre of the vehicle.

A common feature of the aforementioned known wheel suspension systems, therefore, is the fact that they do not compensate sufficiently for changes in track width in both compression and rebound movements of the vehicle wheels.

SUMMARY OF THE INVENTION

An object of the present invention is therefore to propose a wheel suspension, which is capable of compensating for large changes in track width, which occur in long suspension travels, both in compression and in rebound movements of the wheels.

According to the invention this is achieved by a wheel suspension of the type defined in claim 1, more specifically in that, in the wheel suspension described above, the inner end of the lower radius arm is designed for pivotal connection to the vehicle frame by way of a lower arm part of a double rocker arm, swiveling about a substantially horizontal axis, whilst the upper support arm is pivotally connected to an upper arm part of the double rocker arm via a connecting link, which is pivotally connected both to the upper support arm and to the upper arm part of the double rocker arm, so that in the event of a compression movement of the wheel hub, the upper support arm, by way of the connecting link and the rocker arm, displaces the inner end and thereby the entire lower radius arm inwards, and in the event of a rebound movement displaces it outwards, in order to minimize the changes in track width in both compression and rebound movements of the wheel hub.

A further object of the present invention is to provide a wheel suspension which under the aforementioned conditions will allow a high ground clearance of the vehicle. This is achieved in that the lower radius arm is inclined obliquely downwards and outwards from the vehicle frame when the wheel hub is in a neutral position.

An inner end of the upper support arm is suitably designed for pivotal connection to the vehicle frame and extends substantially horizontally to an upper, pivotal fastening point on the wheel hub in a neutral position of the latter, the support arm forming an upper radius arm of the wheel suspension. Alternatively, the upper support arm may be designed as a spring strut of the MacPherson type and can extend obliquely upwards and inwards away from the wheel hub to a pivotal fastening point in the vehicle body.

Further details and characteristics of the wheel suspension according to the invention are specified in the dependent claims and are described in more detail below with reference to exemplary embodiments in the drawings attached.

DETAILED DESCRIPTION OF PREFERRED EMBODIMENTS

Figure 2:
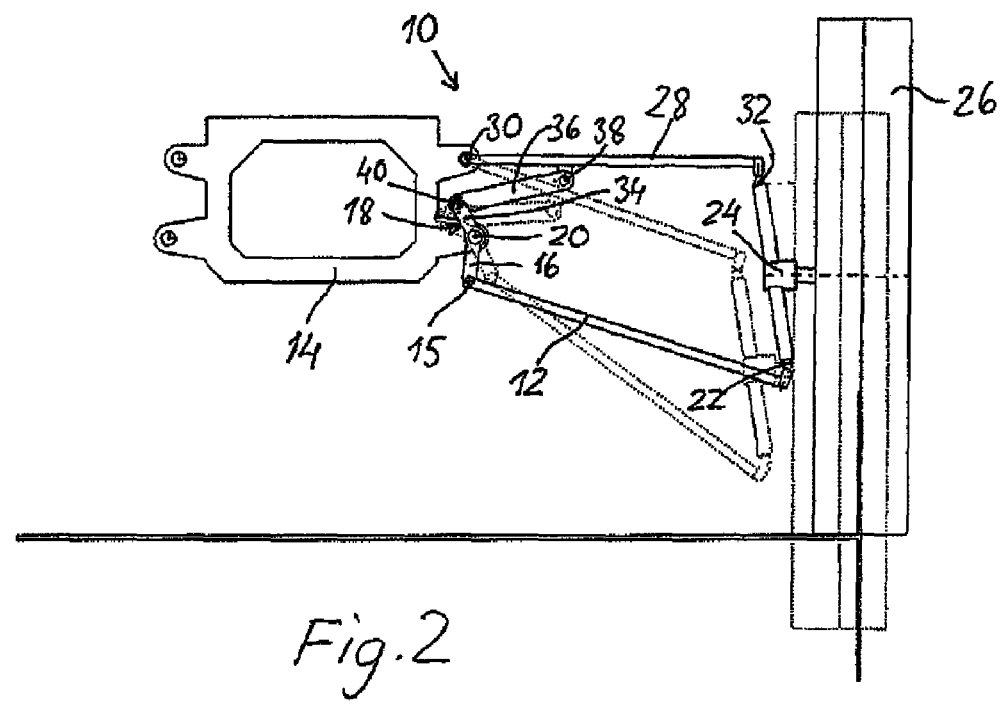
FIG. 2 shows a schematic side view of the wheel suspension in FIG. 1, shown by solid lines in a neutral position and by dotted lines in a rebound state of the wheel.
Figure 1:
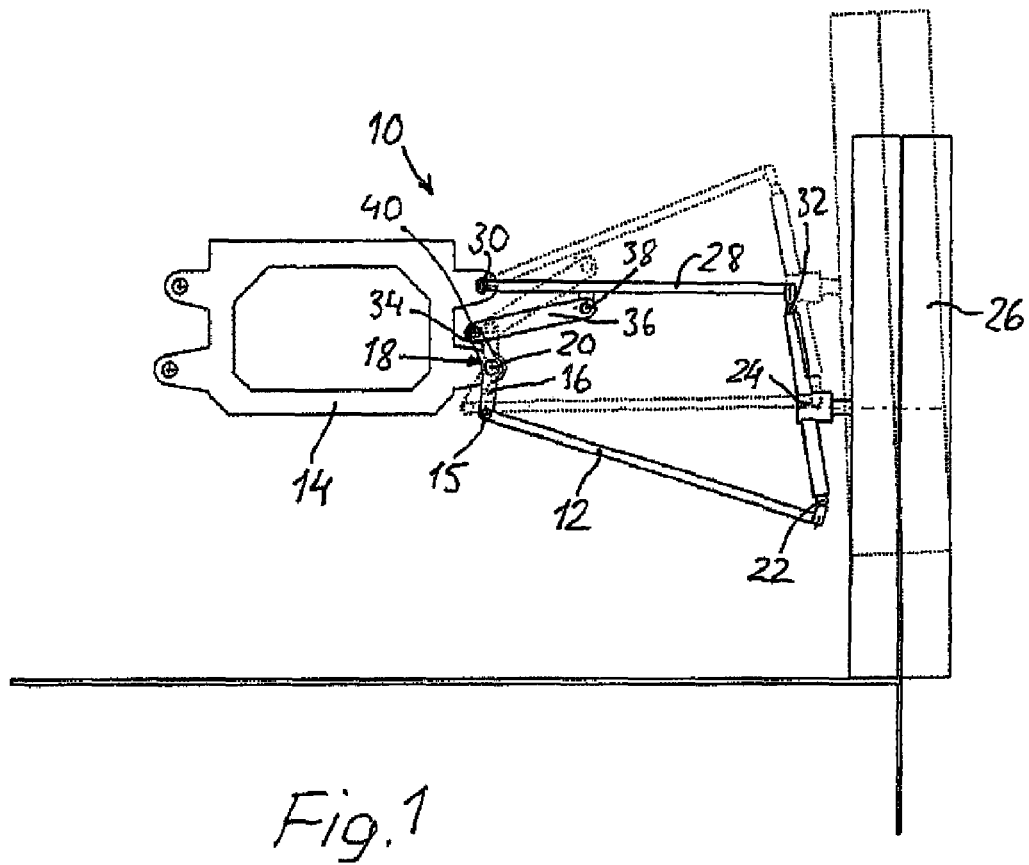
FIG. 1 shows a schematic side view of a first exemplary embodiment of a wheel suspension according to the invention, shown by solid lines in a neutral position and by dotted lines in a compressed state of the wheel.

In FIGS. 1 and 2, 10 generally denotes a first embodiment of a wheel suspension according to the invention for a wheeled motor vehicle. The wheel suspension 10 comprises a lower radius arm 12, which is pivotally and displaceably supported relative to a fixed vehicle frame 14 in that it is pivotally connected at 15 to a lower arm part 16 of a double, track width-compensating rocker arm 18, which is aligned substantially vertically and is supported so that it can pivot about an axis 20 in the frame 14. The outer end of the radius arm 12 is pivotally connected at 22 to a lower part of a wheel hub 24, which rotatably supports a wheel 26. The wheel suspension 10 further comprises a support arm 28, embodied as a radius arm, which at its inner end is pivotally supported in the vehicle frame 14 by way of an axis 30 and at its outer end is pivotally connected at 32 to an upper part of the wheel hub 24. The upper support arm 28 is in turn connected to an upper arm part 34 of the rocker arm 18 by means of a connecting link 36, which is pivotally connected at 38 to the support arm 28 and at 40 to the upper arm part 34 of the rocker arm 18.

In the neutral position of the wheel suspension 10 shown by solid lines, the lower radius arm 12 is inclined obliquely downwards and outwards and is designed substantially longer than the upper support arm 28, in order thereby to afford a relatively high vehicle ground clearance. In plan view, the lower and upper arms, 12 and 28 respectively, may have a basically A-shaped profile, in which the lower radius arm 12 has fastenings 15 to each lower arm part of two parallel rocker arms 18.

As can be seen from the dotted lines in FIG. 1, in the event of a compression movement of the wheel hub 24 and the wheel 26, as when running over a bump in the road, for example, the upper support arm 28 will swing upwards about the axis 30 and, via the connecting link 36, will cause the rocker arm 18 to swivel clockwise about the bearing axis 20 in the vehicle frame 14, the lower arm part 16 of the rocker arm 18 at the same time drawing the lower radius arm 12 inwards towards the vehicle frame 14, in such a way that the wheel 26, as it lifts, will maintain its track width instead of increasing it, which would otherwise happen in the absence of the compensating rocker arm 18.

Conversely, the upper support arm 28, in the event of a rebound movement of the wheel 26 from the neutral position, will be swung downwards, as is shown by dotted lines in FIG. 2, the connecting link 36 forcing the upper arm part 34 of the rocker arm 18 inwards, that is to say swiveling this anticlockwise in such way that the lower radius arm 12 is forced outwards from the vehicle frame 14. The lower part of the wheel 26 is thereby brought outwards in the course of its downward movement, in order to substantially compensate for (reduce) the reduction in track width which would otherwise occur in the absence of the compensating rocker arm 18.

Figure 3:
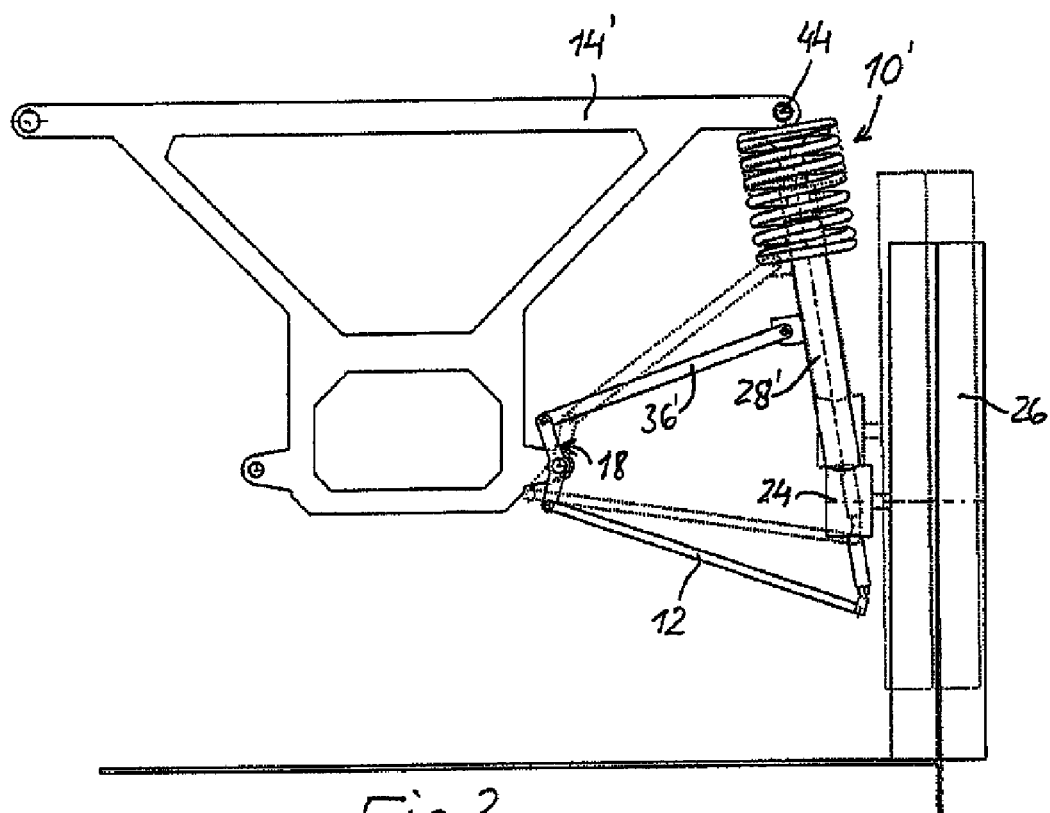
FIG. 3 shows a schematic side view of a second exemplary embodiment of a wheel suspension according to the invention, in which the upper support arm is designed as a spring strut in a wheel suspension of the MacPherson type, the neutral position of the wheel suspension being shown by solid lines, whilst a compressed position is shown by dotted lines.
Figure 4:
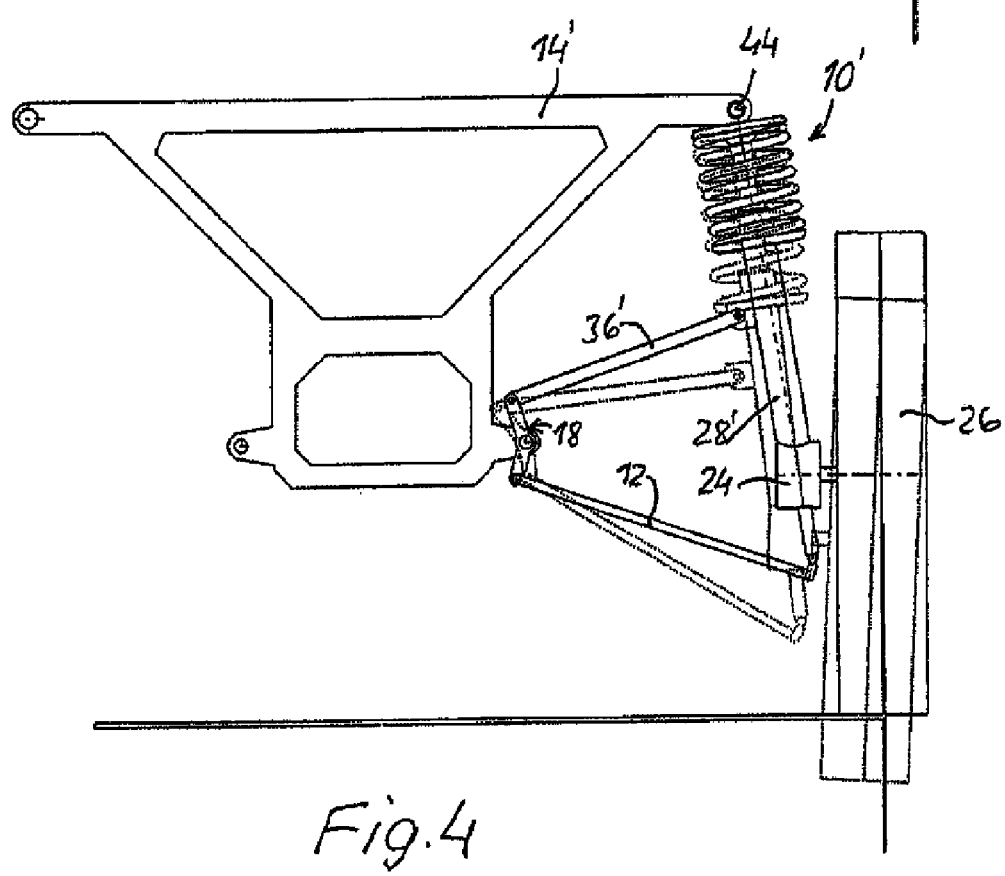
FIG. 4 shows a schematic side view of the wheel suspension in FIG. 3, in which the neutral position of the wheel suspension is again shown by solid lines, whilst a rebound position is shown by dotted lines.

FIGS. 3 and 4 show an alternative embodiment of the invention, suited to a wheel suspension 10' of the Macpherson type, in which the upper support arm is designed as a spring strut 28' connected to the wheel hub 24, the upper end of the spring strut 28' being pivotally connected at 44 to an upper part of the vehicle frame 14'. In a similar way to the first embodiment, the spring strut 28' is connected to the upper arm part of the rocker arm 18 by means of a connecting link 36', which is pivotally connected both to the spring strut 28' and to the rocker arm 18. As can be seen from the dotted lines in FIGS. 3 and 4, the arrangement with a compensating rocker arm 18 and a connecting link 36' pivotally connected between this and the spring strut 28' serves, in the same way as in the embodiment according to FIGS. 1 and 2, to minimize the change in track width both in a compression and in a rebound movement of the wheel 26, that is to say the lower radius arm 12 is displaced inwards towards or outwards away from the vehicle frame 14'. The track width can thereby be kept largely constant.

I claim:

1. A wheel suspension for a wheeled vehicle having independent suspension, the wheel suspension comprising:
    at least one lower, wheel-carrying radius arm with an inner end, which is designed for fastening so that it can pivot about a substantially horizontal axis in a vehicle frame, and an outer end, which is pivotally fastened to a lower part of a wheel hub, and
    at least one upper support arm, one end of which is fastened to an upper part of the wheel hub, and the other end of which is pivotally connected to a part of the vehicle fixed to the frame,
    wherein:
    the wheel suspension is part of an independent suspension system,
    the inner end of the lower radius arm is designed for pivotal connection to the vehicle frame by way of a lower arm part of a double rocker arm, which is aligned substantially vertically and swivels about a substantially horizontal axis, whilst the upper support arm is pivotally connected to an upper arm part of the double rocker arm via a connecting link, which is pivotally connected both to the upper support arm and to the upper arm part of the double rocker arm, so that in the event of a compression movement of the wheel hub, the upper support arm, by way of the connecting link and the double rocker arm, displaces the inner end and thereby the entire lower radius arm inwards,
    in the event of a rebound movement of the wheel hub, the wheel hub is displaced outwards, in order to minimize the changes in track width in both compression and rebound movements of the wheel hub, and
    the double rocker arm has a pivotal connection point located between the upper arm part and the lower arm part.

2. The wheel suspension according to claim 1, wherein the lower radius arm is inclined obliquely downwards and outwards from the vehicle frame when the wheel hub is in a neutral position, in order to afford a high vehicle ground clearance.

3. The wheel suspension according to claim 1, wherein the upper support arm has an inner end wherein the inner end is designed for pivotal connection to the vehicle frame and extends substantially horizontally to an upper, pivotal fastening point on the wheel hub in a neutral position of the latter.

4. The wheel suspension according to claim 3, wherein the upper support arm is shorter than the lower radius arm.

5. The wheel suspension according to claim 1, wherein the axis of the rocker arm in the vehicle frame is situated substantially vertically below the fastening point for the upper support arm in the frame.

6. The wheel suspension according to claim 2, wherein the upper support arm has an inner end wherein the inner end is designed for pivotal connection to the vehicle frame and extends substantially horizontally to an upper, pivotal fastening point on the wheel hub in a neutral position of the latter.

7. The wheel suspension according to claim 2, wherein the axis of the rocker arm in the vehicle frame is situated substantially vertically below the fastening point for the upper support arm in the frame.

8. The wheel suspension according to claim 3, wherein the axis of the rocker arm in the vehicle frame is situated substantially vertically below the fastening point for the upper support arm in the frame.

9. The wheel suspension according to claim 4, wherein the axis of the rocker arm in the vehicle frame is situated substantially vertically below the fastening point for the upper support arm in the frame.

10. The wheel suspension according to claim 2, wherein the lower radius arm and the upper support arm are substantially A-shaped in plan view.

11. The wheel suspension according to claim 1, wherein the connecting link is pivotally connected to the upper support arm at a connection point on the upper support arm between the one end and the other end of the upper support arm.

12. A wheel suspension for a wheeled vehicle having independent suspension, the wheel suspension comprising:
 at least one lower, wheel-carrying radius arm with an inner end, which is designed for fastening so that it can pivot about a substantially horizontal axis in a vehicle frame, and an outer end, which is pivotally fastened to a lower part of a wheel hub, and
 at least one upper support arm, one end of which is fastened to an upper part of the wheel hub, and the other end of which is pivotally connected to a part of the vehicle fixed to the frame,
wherein:
 the wheel suspension is part of an independent suspension system,
 the inner end of the lower radius arm is designed for pivotal connection to the vehicle frame by way of a lower arm part of a double rocker arm, which is aligned substantially vertically and swivels about a substantially horizontal axis, whilst the upper support arm is pivotally connected to an upper arm part of the double rocker arm via a connecting link, which is pivotally connected both to the upper support arm and to the upper arm part of the double rocker arm, so that in the event of a compression movement of the wheel hub, the upper support arm, by way of the connecting link and the double rocker arm, displaces the inner end and thereby the entire lower radius arm inwards,
 in the event of a rebound movement of the wheel hub, the wheel hub is displaced outwards, in order to minimize the changes in track width in both compression and rebound movements of the wheel hub, and
 the upper support arm is shorter than the lower radius arm.

* * * * *